United States Patent
Bieg et al.

(10) Patent No.: US 7,791,826 B2
(45) Date of Patent: Sep. 7, 2010

(54) OPTICAL ASSEMBLY

(75) Inventors: Hermann Bieg, Huettlingen (DE);
Karl-Eugen Aubele, Geislingen/Steige (DE); Yim-Bun Patrick Kwan, Aalen (DE); Stefan Xalter, Oberkochen (DE); Martin Schmidt, Windisch (CH); Saverio Sanvido, Glattbrugg/ZH (CH); Uy-Liem Nguyen, Daettwil (CH)

(73) Assignee: Carl Zeiss SMT AG, Oberkochen (DE)

( * ) Notice: Subject to any disclaimer, the term of this patent is extended or adjusted under 35 U.S.C. 154(b) by 268 days.

(21) Appl. No.: 11/814,713

(22) PCT Filed: Jan. 26, 2006

(86) PCT No.: PCT/EP2006/000684

§ 371 (c)(1),
(2), (4) Date: Mar. 18, 2008

(87) PCT Pub. No.: WO2006/079537

PCT Pub. Date: Aug. 3, 2006

(65) Prior Publication Data

US 2008/0170303 A1    Jul. 17, 2008

Related U.S. Application Data

(60) Provisional application No. 60/647,633, filed on Jan. 26, 2005, provisional application No. 60/647,855, filed on Jan. 27, 2005.

(30) Foreign Application Priority Data

Jul. 19, 2005    (DE) .................... 10 2005 034 235

(51) Int. Cl.
*G02B 7/02* (2006.01)

(52) U.S. Cl. .................. 359/819; 359/822; 359/823

(58) Field of Classification Search ................. 359/819, 359/822–824
See application file for complete search history.

(56) References Cited

U.S. PATENT DOCUMENTS

| | | | |
|---|---|---|---|
| 5,237,362 A | 8/1993 | Ishino et al. | |
| 5,973,863 A | 10/1999 | Hatasawa et al. | |
| 6,246,528 B1 | 6/2001 | Schachar | |
| 6,307,688 B1 | 10/2001 | Merz et al. | |
| 6,560,045 B1 * | 5/2003 | Schletterer | .................. 359/819 |

(Continued)

FOREIGN PATENT DOCUMENTS

EP    0 392 511 B1    1/1996

(Continued)

*Primary Examiner*—Timothy J Thompson
(74) *Attorney, Agent, or Firm*—Fish & Richardson P.C.

(57) ABSTRACT

An optical assembly supported in an arrangement, especially in an objective or in an illuminating or exposure system, in the interior of a housing comprising at least one optical element, especially a lens, a mirror, or an aperture, wherein the at least one element is influenceable by at least one manipulator is characterized in that the at least one manipulator is arranged either outside of the housing or in a holding means that is separated entirely or to a large extent by the help of a decoupling means, and that there is provided an effective coupling between the manipulator and the element to be influenced by the manipulator in the interior of the arrangement.

63 Claims, 11 Drawing Sheets

U.S. PATENT DOCUMENTS

Figure 1:
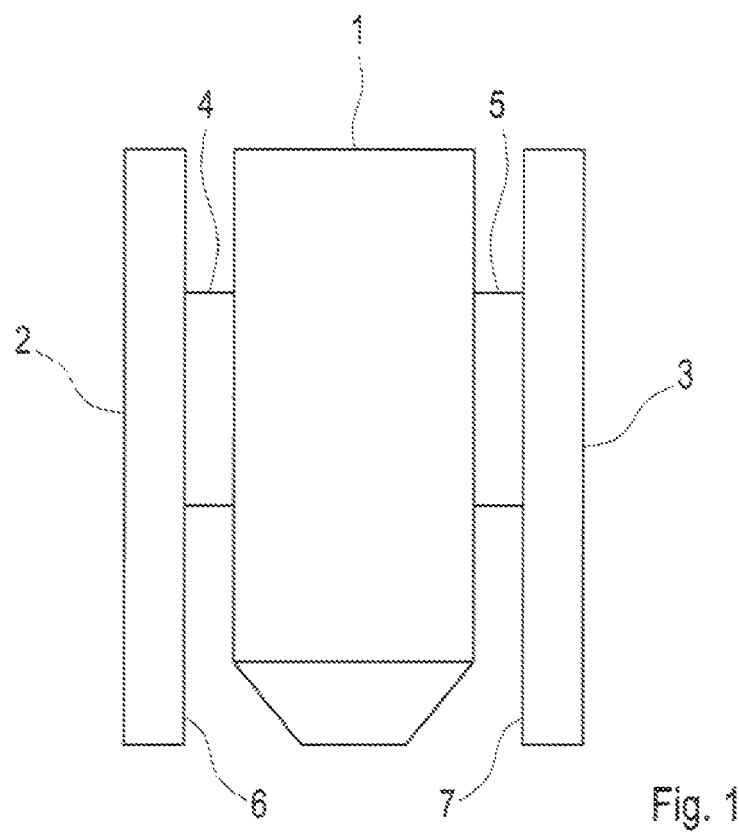

| | | | |
|---|---|---|---|
| 7,599,001 B2 * | 10/2009 | Nagano | 348/374 |
| 2001/0038500 A1 | 11/2001 | Shibazaki | |
| 2002/0104896 A1 * | 8/2002 | Nemoto et al. | 239/152 |
| 2002/0150324 A1 | 10/2002 | Laor | |
| 2004/0189969 A1 | 9/2004 | Mizuno | |
| 2004/0257683 A1 | 12/2004 | Petasch et al. | |
| 2007/0024998 A1 * | 2/2007 | Bills et al. | 359/850 |

FOREIGN PATENT DOCUMENTS

| | | |
|---|---|---|
| EP | 1 385 034 A1 | 1/2004 |

* cited by examiner

OPTICAL ASSEMBLY

CROSS-REFERENCE TO RELATED APPLICATIONS

This application is a National Phase application under 35 U.S.C. §371 filed from International Patent Application Serial No. PCT/EP2006/000684, filed on Jan. 26, 2006, which claims priority to U.S. Provisional Application Ser. No. 60/647,633, filed Jan. 26, 2005, and Ser. No. 60/647,855, filed Jan. 27, 2005. International Patent Application Serial No. PCT/EP2006/000684 also claims priority to German Patent Application Serial No. 10 2005 034 235.3, filed on Jul. 19, 2005.

The invention relates to an optical assembly supported in an arrangement, especially in an objective or in an illuminating or exposure system, in the interior of a housing comprising at least one optical element, especially a lens, a mirror, or an aperture, wherein the at least one element is influenceable by at least one manipulator.

Such manipulators serve to exert a force or forces parallely to an optical axis, in tangential or radial direction of the optical element, on the element itself or on a support or mounting surrounding the element peripherally.

According to U.S. Pat. No. 5,973,863 an exposure projection apparatus is described wherein actuators (FIG. 4, 5) serve to change the length of an optical distance in the interior of the exposure apparatus. The actuators act on the mount of a lens and shift the mount together with the lens with respect to a mount of a neighbouring lens wherein the mounts of the lenses are arranged glidingly with respect to one another. A hermetic exclusion of particles between the two mounts is not realizable in this apparatus. Instead of mechanic actuators, piezo-elements dependent on tension may be applied that have different extensions in the direction of the optical axis of the exposure apparatus because of electrostriction that is dependent on voltage.

A lens having a variable focal length is disclosed in U.S. Pat. No. 6,246,528 B1. The lens comprises two optical border surfaces and a synthetic, elastically deformable and transparent refracting body that may be exposed to a tension by actuators having an effect on the radial direction, e.g. micrometer screws that are positioned on its lateral periphery.

From U.S. Pat. No. 6,307,688 B1 the application of actuators acting in a radial direction of an optical element, especially a lens, is known to exert a tension or a pressure, a stress or a strain. In the region between an inner mounting ring supporting the lens and an outer mount levers in form of a T are used to exert forces on the mounting ring. Instead of mechanic means to exert forces the force may be generated by piezoelectric means or by hydraulic, pneumatic or electric units with respective motors or engines.

According to US 2001/0038500 preferably piezoelectric elements are used as actuators to act on a lens of an exposure apparatus in tangential direction with respect to its outer circumference. In addition, swinging movements or displacements are fulfilled by the actuators.

When applying components controllable by electronic means as actuators or sensors energy is carried into the optical system leading to local warming up. Because of the warming up optical elements or their mounts are shifted or deformed leading to imaging failures.

In known optical apparatuses actuators and sensors often are positioned in the interior or at the periphery of the exposure apparatus.

It is an object of the present invention to provide for an optical arrangement by that the stability of arranging optical elements with respect to one another and the precision of imaging be improved.

According to the invention this object is resolved by an arrangement as mentioned in the beginning of the present application characterized in that the at least one manipulator is arranged either outside of the housing or in a holding means that is separated entirely or to a large extent by the help of a decoupling means, and that there is provided an effective coupling between the manipulator and the element to be influenced by the manipulator in the interior of the arrangement.

By the invention heat generating manipulators or actuators or other installations generating heat are separated entirely or largely from the optical elements. By this way heat generated by an actuator cannot penetrate into the objective or the exposure system. By separating the actuator unit and the objective or the exposure system mechanic connecting elements, for example, are necessary to manipulate the optical elements actively. Particles possibly generated by the connecting means may not penetrate to the objective or the exposure system; according to the invention measures are described to prevent them from penetrating or permeating.

Advantageous embodiments of the invention result from the dependent claims, the description and the drawings.

Advantageously, an embodiment of the invention comprises a manipulator wherein the manipulator is an active driving element or comprises it, wherein, preferably, the manipulator comprises an electronic element, a sensor, or an actuator or another device for contactless measuring.

Preferably, the manipulator additionally comprises a measuring apparatus, especially a laser or another measuring installation for contactless measuring, or an actuator for recording e.g. movements of driving elements and to forward these to a controlling computer.

Advantageously, a driving element, especially a motor or an actuator, may be coupled to a decoupling element that decouples damaging movements as oscillations or vibrations that are superimposed to the wished movement. The decoupling element therefore comprises a damper to forward the single one wished movement for instance of a shaft or a pushing or driving rod, to the interior of the housing to change the position or to shift the optical element, for instance, to change its height. A connection between the manipulator and the optical element either in the interior of the housing or of the objective or of the exposure system to be influenced by the manipulator is realized by an embodiment or by implementing or applying electric or magnetic forces. Preferably, the system is characterized in that the effective coupling is constituted by a shaft, especially a flexible or a cardanic shaft, a thread, a strand, a rod, especially a connecting rod, an arrangement comprising multiple rods or by a spring.

In another advantageous embodiment a rod, especially a connecting rod or a shaft or another element connecting the manipulator to the element by a seal, especially by means of an O-ring of rubber or synthetics, is sealed with respect to the interior of the housing. Thereby penetrating of particles into the interior of the objective or of the exposure system is prevented.

In the alternative or additionally, a manipulator is provided that impinges on an optical element by means of an electric field, a magnetic field or a combination of an electric and a magnetic field without any mechanic connection between the interior of the element and the exterior. For instance, a permanent-magnetic mount of a lens may be moved by applying an outer magnetic field.

Advantageously, the manipulator may be comprised by a support in form of a tower, a ring, or a column outside the housing of the optical element. By separating the substantially mere mechanic arrangement that comprises motors, sensors or electronic parts from the interior of the objective or the exposure system a negative influence as warming up and vibrations, reduced possibilities of maintenance and exchangeability caused by manipulator elements arranged in the interior of the optical elements are avoided as far as possible.

In an embodiment of the invention an annular support is separated from the housing by an interspace or a gap so that damaging influences as thermal radiation and heat conduction, the emission of particles, as debris of driving elements, and mechanic oscillations are kept away from the housing and thus from the optical elements.

The interspace, for its part, is insulated thermally and/or electrically and/or against penetration of particles with respect to the exterior space so that only wished effects influencing the assembly from the exterior are admitted to the objective or any other means in the interior, as are impingements or effects necessary to adjust the objective or to measure a value of the objective. The interspace forms a kind of a sluice that reinforces the separation and exclusion from the environment as embodied by the annular support. Thereby, in the direction from the support, the interspace to the housing, the restrictions against penetration of particles, allowed vibrations or changes of temperature increase. This means, e.g., that allowed vibrations of temperature in the interspace are lower than in the support or holder.

Additionally, it proves advantageous if the distance between the housing and the support is measured by a measuring device, especially by a means comprising a laser and a mirror. For this aim, mirrors may be arranged on the exterior wall of the housing. Lasers arranged in the support irradiate these mirrors with laser beams; the reflected laser beams give information about the distances between the housing and the support and permit to change this distance between the housing and the support by an adjusting means for adjusting the distance.

In an advantageous embodiment it is arranged for the at least one manipulator and/or the measuring device to be connected to a controlling computer or another unit, especially by an interface, to evaluate the signals coming from the support and/or the housing. In the same way the controlling computer generates signals for the manipulator, the measuring arrangement and/or for the units positioned in the interior of the housing.

To reduce or to avoid entirely thermal radiation emanating from the manipulator a cooling jacket, especially provided with cooling fins, is used. In the alternative, the manipulator is solely or together with a cooling element included in an own housing whereby the housing is preferably formed by a thermal insulator. Preferably a Peltier element serves as a cooling element that is, as the manipulator, connected to a current source and that provides for cooling to that degree in that the manipulator emits heat. In the case that the objective or the exposure system is surrounded by a cooling jacket providing the manipulator in the range of the cooling jacket generates a spatial advantage in that it needs less space. By this way it is possible that an objective or an exposure system is surrounded by a construction of shells that fulfils a cooling function and additionally, comprises a manipulator or a plurality of manipulators. From such an arrangement only the wished effect of the manipulator is transferred to the interior of the objective or the exposure system whereas deformations, thermal radiation, or thermal conduction are prevented from entering into the housing supporting the optical elements. According to the invention the manipulator, preferably, comprises a motor and/or an actuator. The motor may be an electric motor, i.e. a rotational or a linear motor, or a pneumatic or a hydraulic motor.

In another advantageous embodiment of the invention a manipulator is provided that is connected to the housing by an active or a passive decoupling element.

Further, it is advantageous if the manipulator is attached to the housing by a passive damping element, especially by a spring, preferably by a soft spring.

In the alternative a manipulator is attached to the housing by an active damping element, especially by a piezo actuator.

Further, advantageously, a manipulator may be coupled to the housing by a thermal insulator to avoid thermal conduction of heat generated in the manipulator into the interior of the housing.

A shielding of thermal radiation is advantageous wherein the manipulator is shielded by an active or a passive cooling element surrounding the housing at least in the proximity of the manipulator.

A further measure to prevent heat from the objective or the exposure system consists in connecting the manipulator to the cooling element by a connection or a link conducting the heat.

Preferably, a manipulator is provided that is separated from the interior of the housing by a shield shielding off particles, especially by a labyrinth seal or a gap seal or by an expandable bellows seal, especially made of metal or rubber. By this way actuators or sensors are prevented from generating or emanating particles that damage optical elements, as do synthetics, adhesives, lubricants or similar substances as wear debris generated at gear indentations.

Preferably, the system is embodied in that way that the actuator acts from the outside on an element inside of the housing that is activated by a magnetic or an electric field wherein the housing consists of a dielectric material.

The invention, too, pertains to a system in that, advantageously, a sensor is positioned outside of the arrangement and wherein the sensor is an electric, a magnetic or an electromagnetic sensor, especially an optic sensor.

Advantageously, the sensor is surrounded by a cooling jacket and/or a cooling element is arranged in the proximity of the sensor, or the sensor is surrounded by a thermal insulator.

Advantageously, a cooling element is arranged between the manipulator and the sensor.

Advantageously, the system is characterized in that a thermal detector is provided in the proximity of the manipulator or the sensor to detect the heat generated by the manipulator or the sensor, respectively.

Another advantage consists in a cooling element that is controllable by values generated by a detector and that receives the heat and/or compensates for it by cooling. The amount of heat generated may be measured by a detector, and a voltage may be applied to a cooling element, e.g. a Peltier element, that is sufficient to equalize the heat by cooling.

To shield the optical system, according to the present invention an arrangement of shells is provided for the objective or the exposure system wherein the at least one optical element is positioned in an inner shell of the objective and the manipulator is positioned in an outer shell of the objective.

Additionally, the invention pertains to an arrangement, especially a system positioned in an objective with at least one optical element, especially a lens, a mirror or an aperture, wherein the at least one element is arranged in a housing and is influenceable by at least one manipulator arranged in the interior of the housing. In this system, according to the invention, there is provided at least one manipulator decoupled from the housing by a dynamic decoupling element. Therefore an active element is positioned at the structure of the objective, for instance, or at a part of the wall of the housing.

Additionally, a quality or property of the at least one element, especially of that element that is adjusted by the manipulator, may be ascertained by a sensor or a detector.

To provide for a good decoupling, preferably, a manipulator and/or a sensor are arranged on the inner side of the housing.

A system is preferred, in which the decoupling element is a passive element, especially a spring. In the alternative, the decoupling element may be embodied as an active element, especially as a piezoelectric actuator.

In a preferred embodiment of the system the interior of the housing may be set under an excess pressure with respect to the outside environment. When a stream of the gas from the inside of the housing streaming through openings of the housing to the outside has a sufficiently high streaming velocity it is prevented that particles permeating from outside to the inner side of the housing sit down on the optical elements or lead to chemical reactions with coatings on the elements. By the excess pressure in the interior of the housing a gas contamination caused by particles penetrating from the outside is prevented.

In addition, springs that may be adjusted or pneumatic or hydraulic cylinders may be used as mechanic actuators.

Especially, the invention is related to an optical system or assembly arranged in an embodiment, especially in an objective or an exposure system, with at least one optical element, especially a lens, a mirror, or an aperture, wherein the at least one element is influenceable by a manipulator and wherein the manipulator comprises a mechanism for adjusting precisely or for micro-adjusting of the optical element or of a plurality of optical elements. Such a manipulator may be used according to the invention when an arrangement for a precise adjustment of the optical system for projection-lithography is needed, especially for immersion lithography.

In known systems for projection-lithography a plurality of manipulators is used to make possible changes of position of certain optical elements in up to six degrees of freedom. The movements are carried out in regular intervals of time, for instance, in intervals of five minutes or an hour; an active controlling of position is known, too, to compensate for imaging failures caused by effects of drift including a thermal drift. The adjustment of position usually is realized by piezoelectric actuators in combination with high-resolution position sensors, as are capacitive sensors or high-resolution encoders.

In the alternative, according to the state of the art, small-sized direct current servomotors are used in combination with reduction gears that drive threaded spindles or that comprise a coupling-back by means of an encoder. This procedure is limited as to its precision because of counter-movements in the gear and the threaded spindle; besides it requires a high-resolution position sensor and a closed servo-control loop.

As the requirements as to precision of position are yet higher in immersion lithography because of an increased aperture than in usual lithography more and more optical elements need not only to be adjusted during assembly with an increasing degree of precision not attainable by known technologies, but need to be adjusted in relatively small intervals of time (for instance, a week or a month). For such purposes piezoelectric actuators of the state of the art are too expensive.

It is the object of the invention to provide for a method of adjustment to attain the required precision.

According to the invention, there is provided at least one manipulator comprising a step motor by which the optical element is adjustable. The element may be precisely adjusted by the step motor that may be used in an open control loop or in a closed loop.

According to the present invention the optical element is arranged either inside a mount so that an adjusting element is attached either to the optical element itself or at that mount that supports the element. The step motor may be positioned either in a housing surrounding the optical element or in another holder; the step motor may, in the alternative, be positioned on the outside of the housing.

In a preferred embodiment a step motor is provided that is linked or connected to the optical element by means of a reduction gear. The solution according to the invention uses a step motor as an actuator in connection with a high reduction ratio, a reduction gear free of counter-movements and free of hysteresis, and a mechanism free of a clearance for converting a rotational movement of the step motor into a linear movement within the required interval.

The most important advantage of the step motor in this special application consists in the simplicity of the driving electronics, at present available on one single chip and that can drive and control a plurality of motors. Such motors usually have a precision of repetition of 5% at a single step of movement; and they may be inserted in an open control loop without coupling back of their position, so that there is no need for an expensive position sensor. Even when the power is switched off the motor has a sufficient holding torque (Haltemoment).

Just as important is the missing of a clearance in the transmission chain following to the driving motor, which cannot be achieved when a conventional planet gear of the state of the art is used. The micro-harmonic planet driving gear available not long since solves this problem and provides for a reduction of a ratio of 1:1000 with respect to each step of the step motor. The pure rotational motion of the micro-harmonic drive ensures a motion without stick-slip-effects and wear and tear.

Advantageously, according to one embodiment of the invention the step motor and/or the reduction gear comprises an eccentric drive or an eccentric shaft. An eccentric shaft that drives an arrangement of mechanic connections or links to reduce the rotation of the shaft in a much smaller interval of a movement is applied to transform a rotational movement into a linear, clearance-free movement by applying the micro-harmonic drive.

Advantageously, herewith a shaft having an eccentricity between 0.2 and 2 mm may be applied.

It is advantageous if the reduction gear comprises mechanical reduction means, especially a lever. Instead of a single lever a plurality of levers may be applied that are interconnected by solid body hinges (Festkörpergelenke).

The application of micro-harmonic reduction drive gear as reduction gear is of special interest. Such a micro-harmonic drive-reduction gears are disclosed on the website http://www.mikrogetriebe.de/sites/deutsch/p-mikro-g.html, for instance.

In the region or the field of the step motor and/or of reduction gear the application of flexible structures, especially of solid body hinges or of monolithic elements an/or and/or of clearance-free, pre-stressed ball bearings or anti-friction bearings is advantageous.

By the invention, therefore, optical element may be adjusted precisely on a long time interval by the application of step motors that may be driven in an open control loop.

Additionally, the invention pertains to an optical system or arrangement supported in an embodiment, especially an objective, inside of a housing with at least one optical element that is influenceable by a manipulator. The manipulator may comprise a solid body hinge Such manipulators serve to exert forces parallely to an optical axis, or in tangential or radial direction of the element on the element itself, especially the optical element itself, or on a mount or a holder surrounding peripherally the element.

According to U.S. Pat. No. 5,973,863 an exposure apparatus is described comprising actuators (FIG. 4, 5) that are used to change the length of the optical distance inside the exposure apparatus. The actuators act on the mount of a lens and move the mount together with the lens with respect to the mount of a neighbouring lens wherein the mounts of the lenses are arranged glidingly.

From U.S. Pat. No. 6,307,688 B1 the application of actuators effective in radial direction of an optical element, especially of a lens, is known to generate stress and strain forces. Levers in form of a T are used in the range between an inner holding ring receiving the lens and an outer mount. The levers permit the application of forces onto the holding ring. Instead of mechanical generation of a force, forces may be generated by piezoelectric or hydraulic units.

Manipulators of the state of the art having a solid body hinge have the disadvantage that the force necessary to displace the solid body hinge to adjust the manipulator varies about a high degree. The necessary force rises considerably with a rising displacement of the solid body hinges. From this it follows that the consumption of power of the actuator or manipulator increases and that the dissipation of heat increases too, having a negative influence on the system.

High forces act on the bearings and gears that cause an increased wear and reduce lifetime of these elements.

Another problem of the state of the art is that, if manipulators with elastic solid body hinges are displaced in both directions over greater distances, this can have the disadvantage that no force is applied to the system when the system is in its middle-neutral-position. When a gear comprising a threaded spindle the clearance can cause an undefined state or inaccuracies when the spindle or gear is to be positioned.

It is the object of the invention to create an optical system that avoids the disadvantages of the state of the art.

According to the invention this problem is solved by a system as mentioned above wherein the manipulator comprises an element counteracting the force exerted by the solid body hinge or that serves to compensate at least partially for a force or a torque exerted by the solid body hinge in dependence on its displacement.

According to the invention magnets, especially electromagnets, are placed at an manipulator, in such a way that they counteract the spring force of the solid body hinge or of a plurality of solid body hinges or compensate for them.

Advantageous embodiments of the invention are disclosed by the dependent claims, the description and the drawings.

Preferably, the invention is applied in an objective or in an exposure system, especially for projection exposure systems.

The invention also pertains to an objective and an illuminating or exposure system, especially in a projection exposure apparatus of micro-lithography comprising an optical system with at least one optical element that is influenceable by a manipulator comprising a first and a second means wherein the first means generates a repelling force and/or a repelling torque. The manipulator comprises a second means that counteracts the repelling force and/or the repelling torque generated by the first means and at least partially compensates for the force and/or the torque generated by the first means.

The objective or the exposure system according to the invention are preferably designed in that way that the second means compensates for the force and/or the torque of the first means.

In another embodiment of the objective or the exposure system according to the invention the second means is constructed in that way that the force and/or the torque of the first means are overcompensated.

In a preferred embodiment of the objective or of the exposure system the first means comprises a hinge that is designed as an elastic solid body hinge.

The objective or exposure system as it was described above in different embodiments is preferably designed in that way that the second means comprises a magnet, a mass, a spring or a capacitor or a combination of these elements.

Advantageously, a magnet, a mass or a spring is used as that element. Additionally, the element is applied to the solid body hinge by a lever.

Advantageously, an embodiment of the system comprises, on both sides of a driving arm for acting on a solid body hinge or on a plurality of solid body hinges, elements for exerting a force on the driving arm or for at least partially compensating of a force generated by a solid body hinge in dependency on a displacement or a torque of the solid body hinge.

Advantageously, the objective or the exposure projection system are characterized in that the second means generates a force or a torque that is are function of the distance or the angle, respectively.

Figure 2:
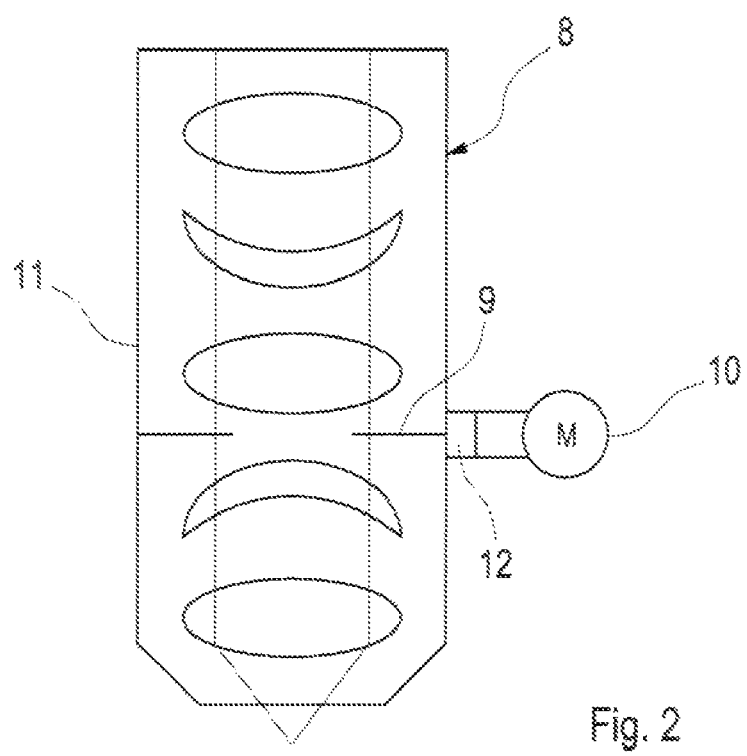
Figure 3:
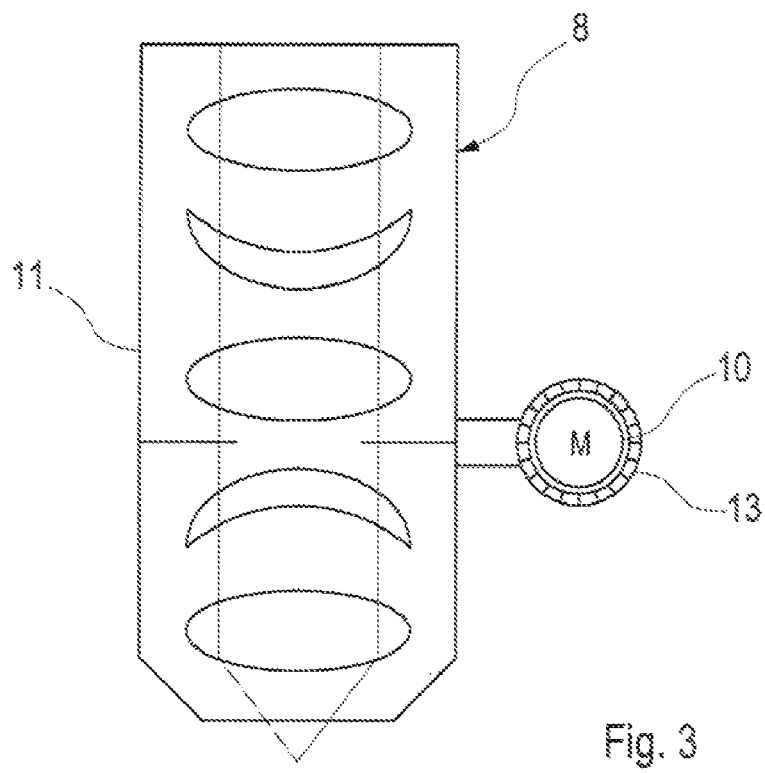
Figure 4:
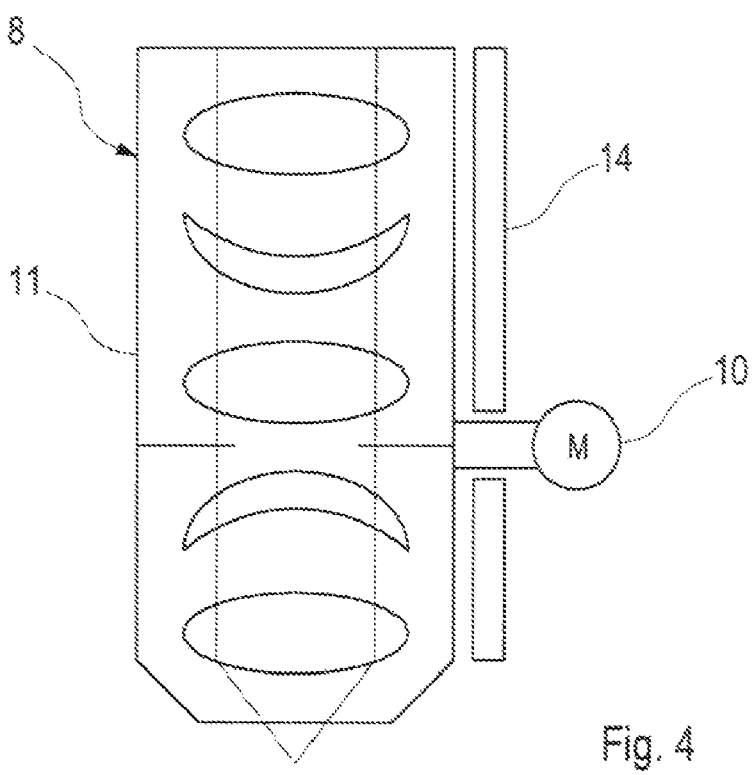
Figure 5:
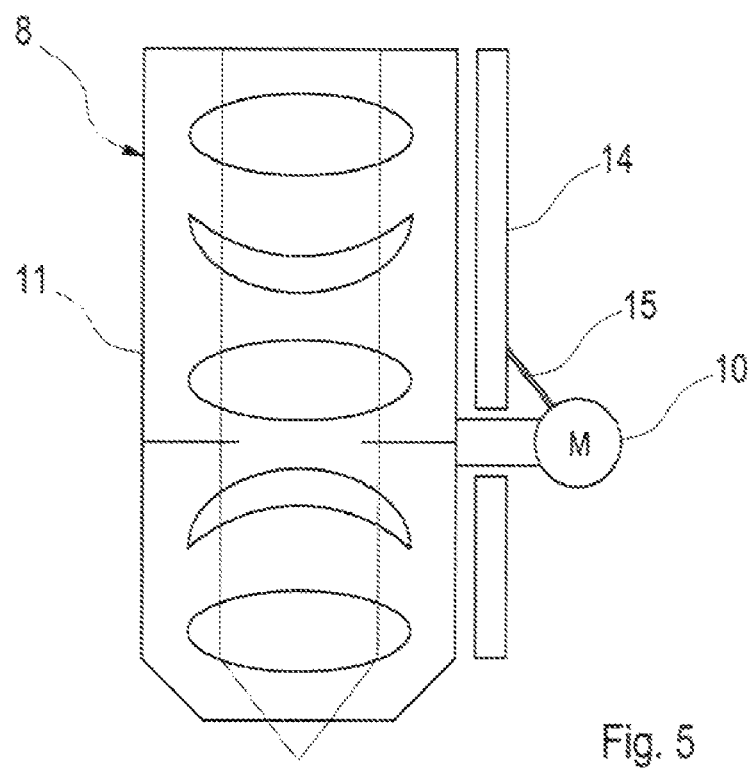
Figure 6:
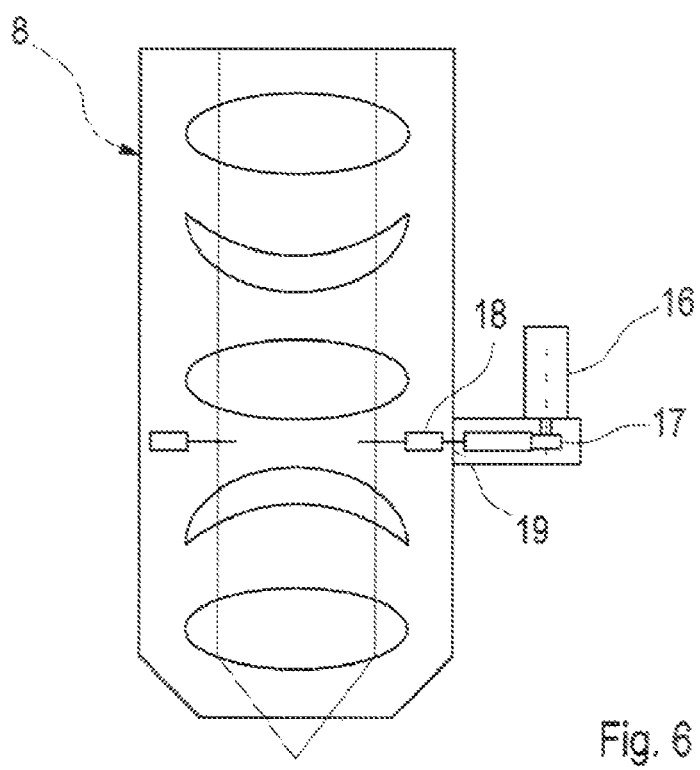
Figure 7:
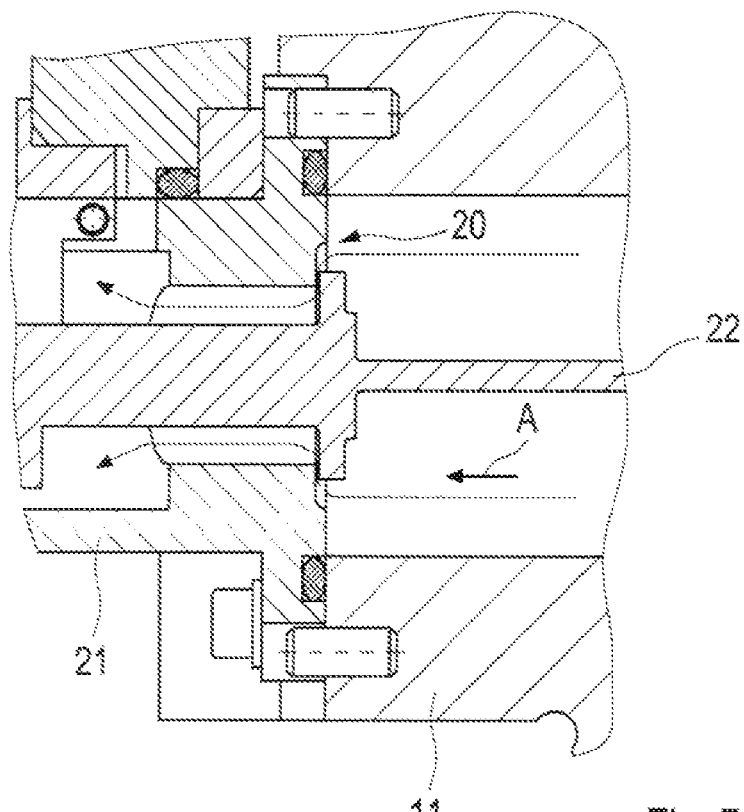
Figure 8:
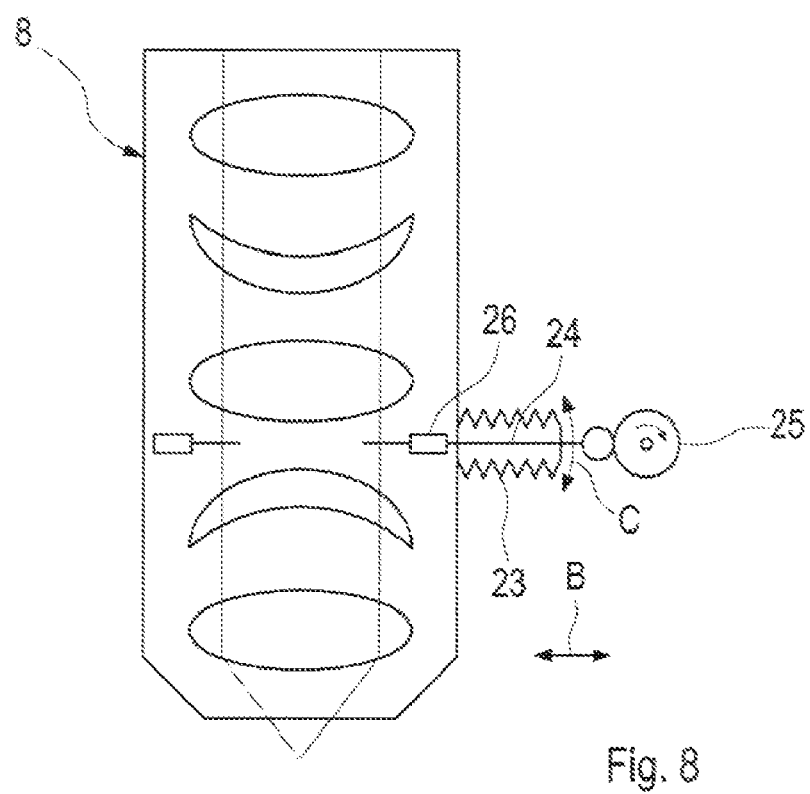
Figure 9:
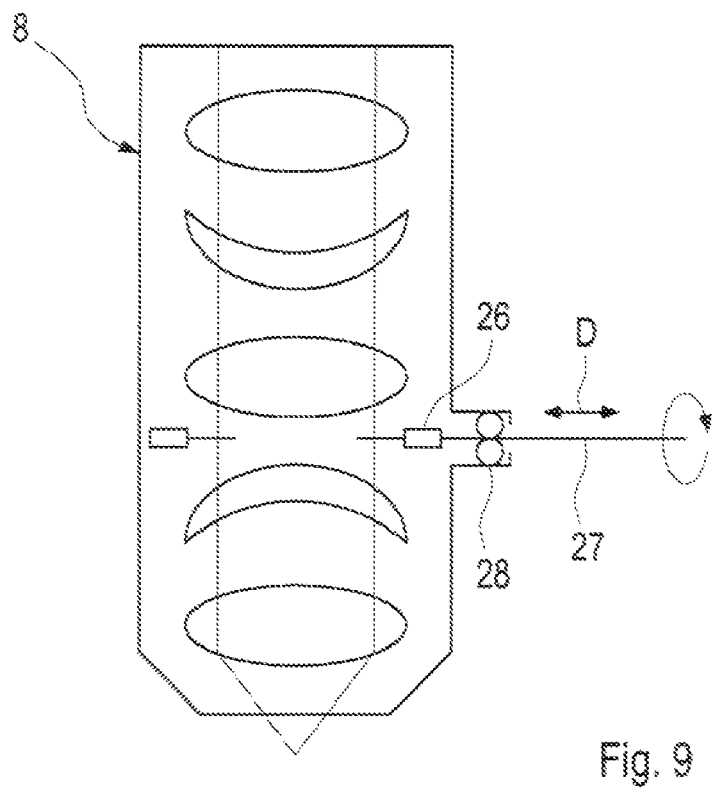
Figure 10:
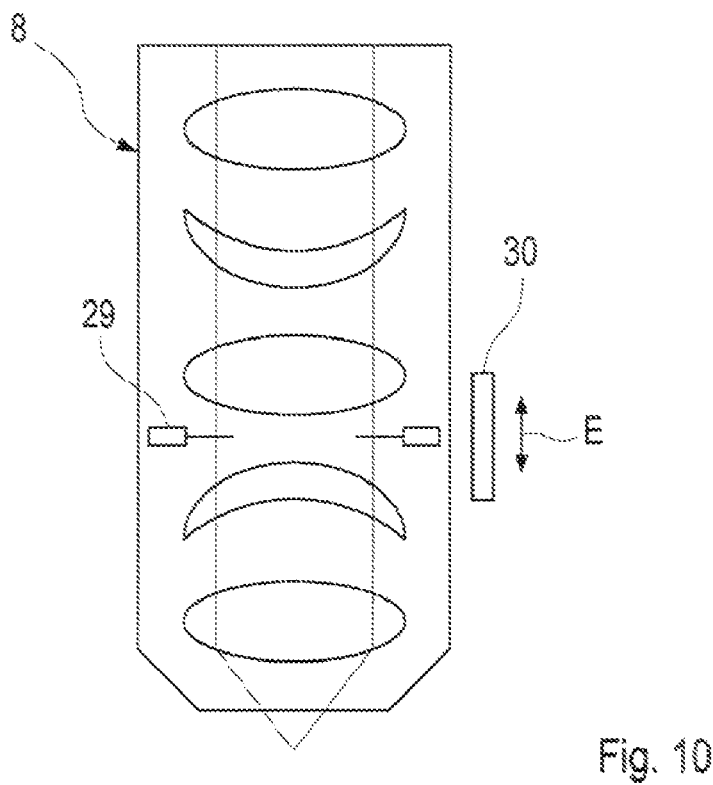
Figure 11:
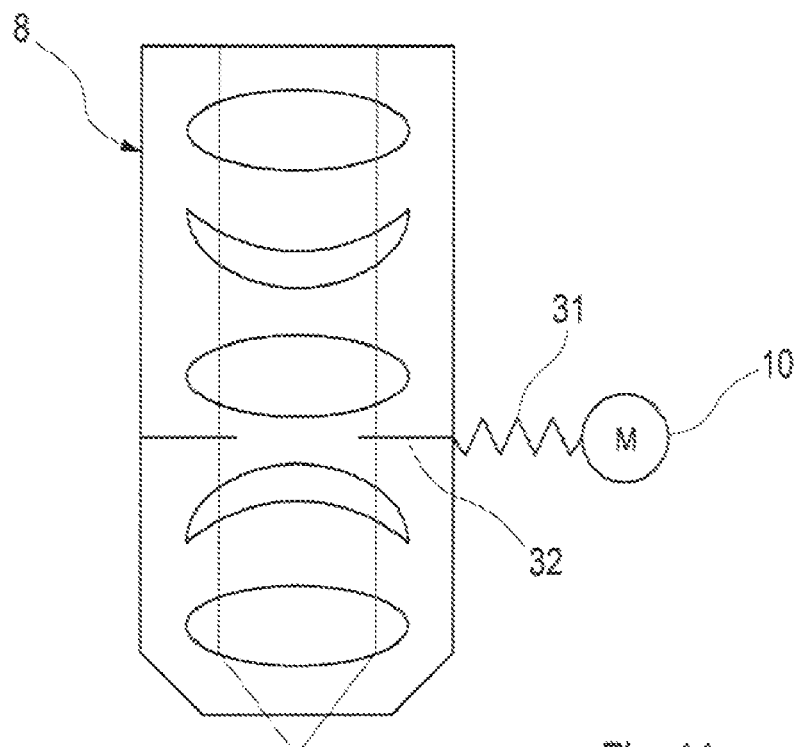
Figure 12:
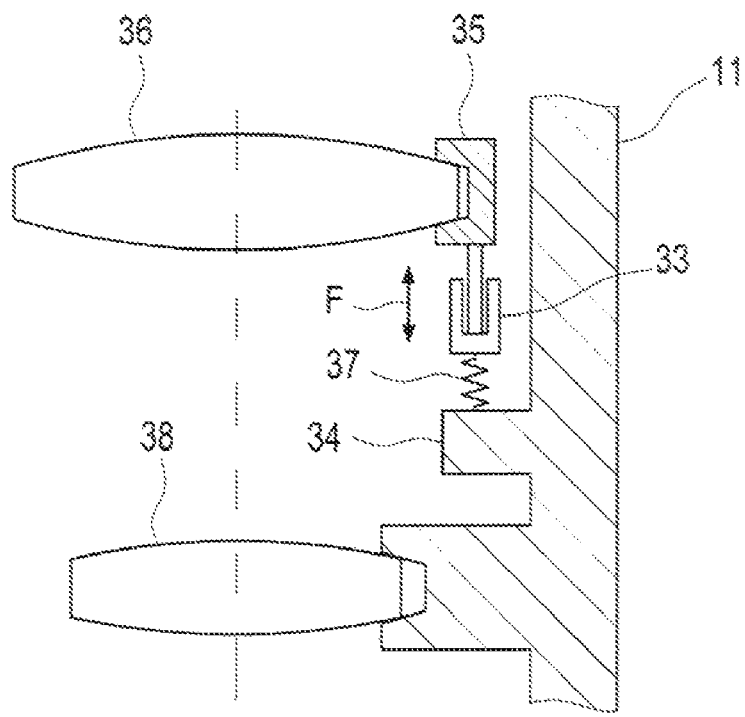
Figure 13:
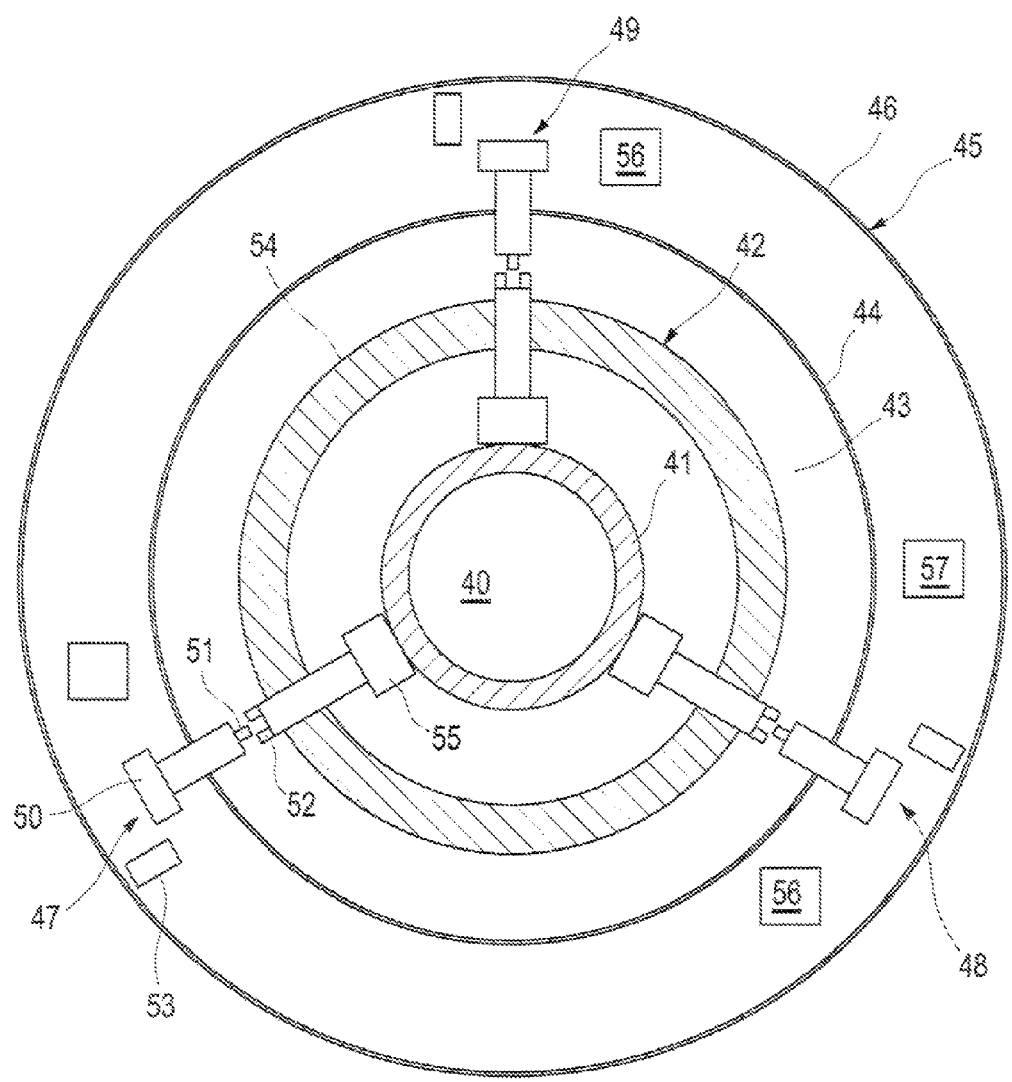
Figure 14:
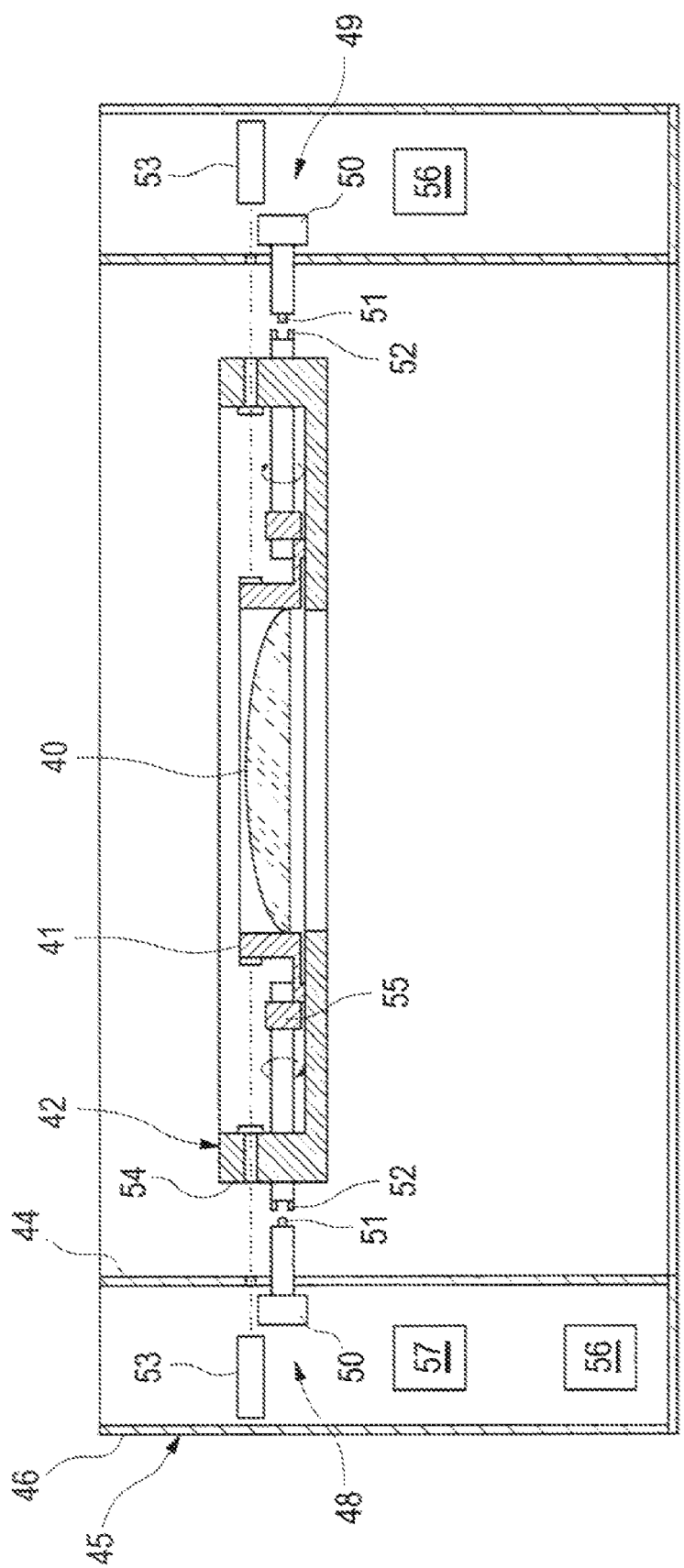
Figure 15:
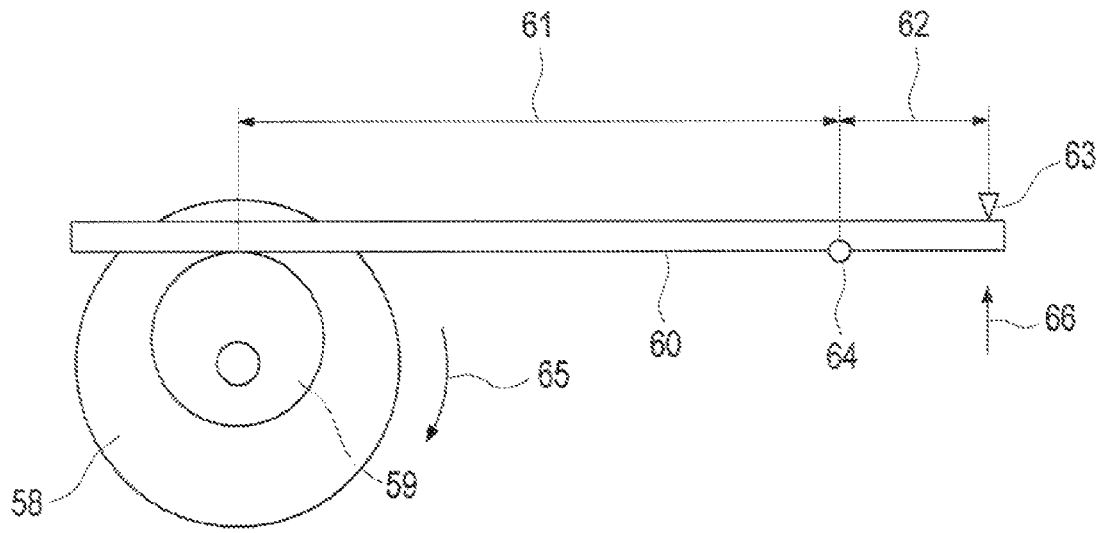
Figure 16:
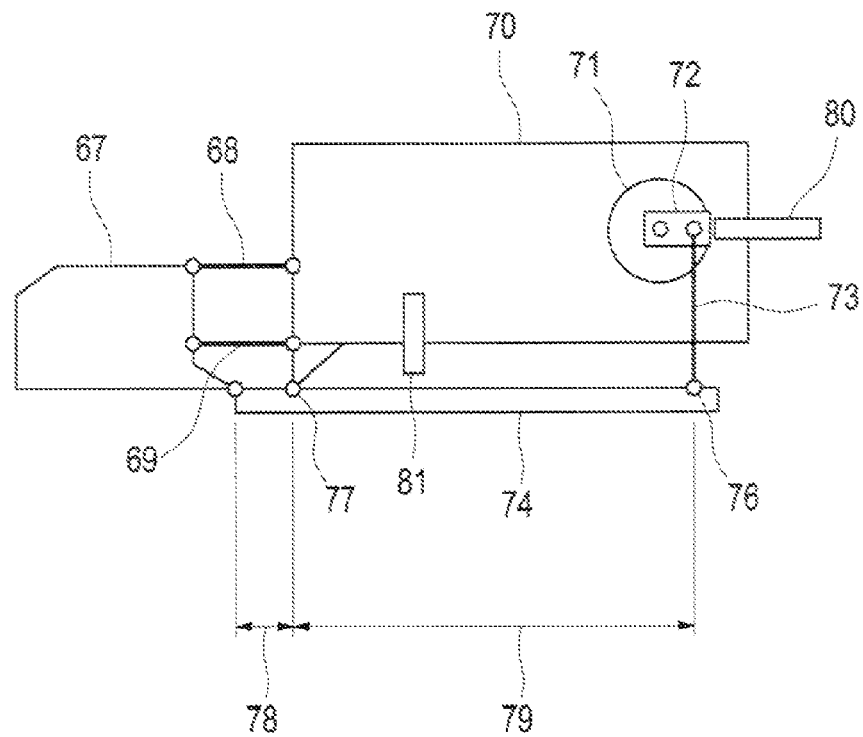
Figure 17:
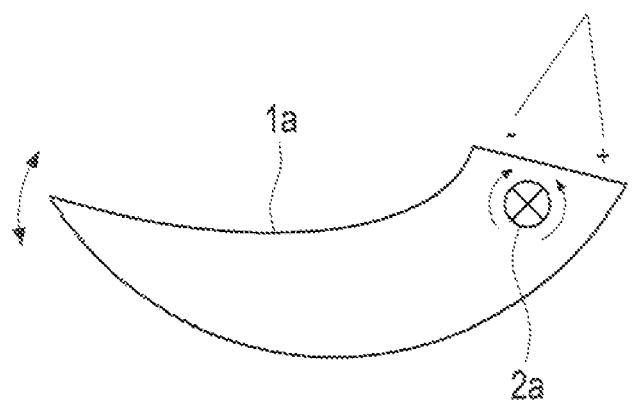
Figure 18:
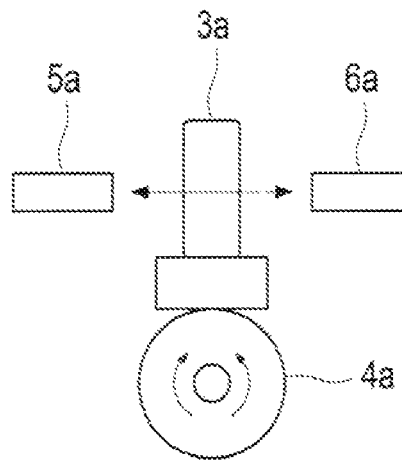
Figure 19:
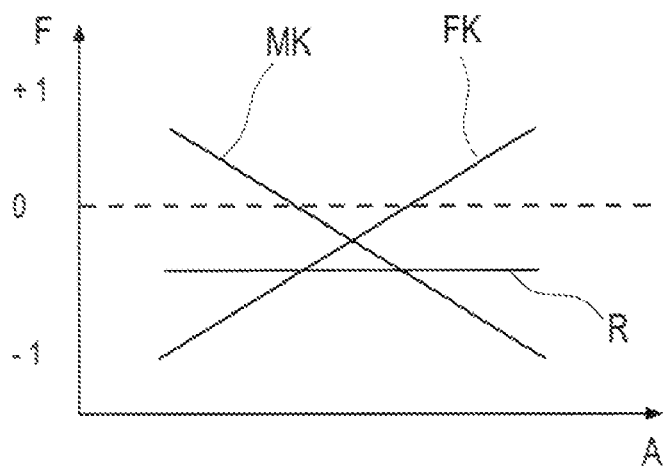
Figure 22:
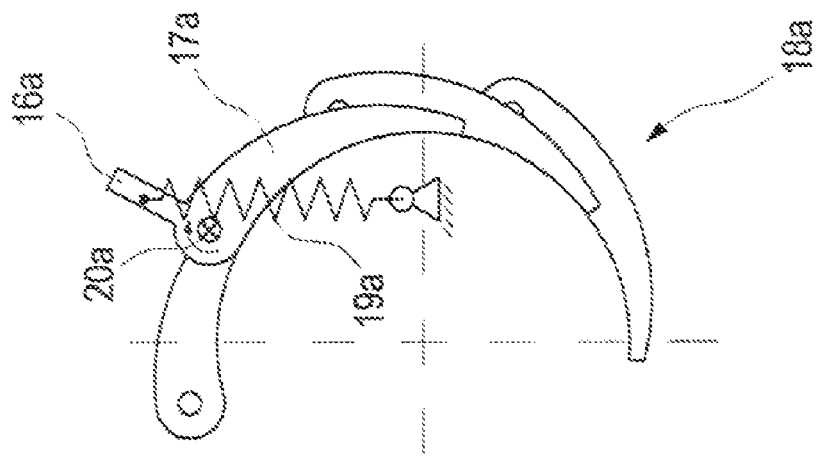
Figure 21:
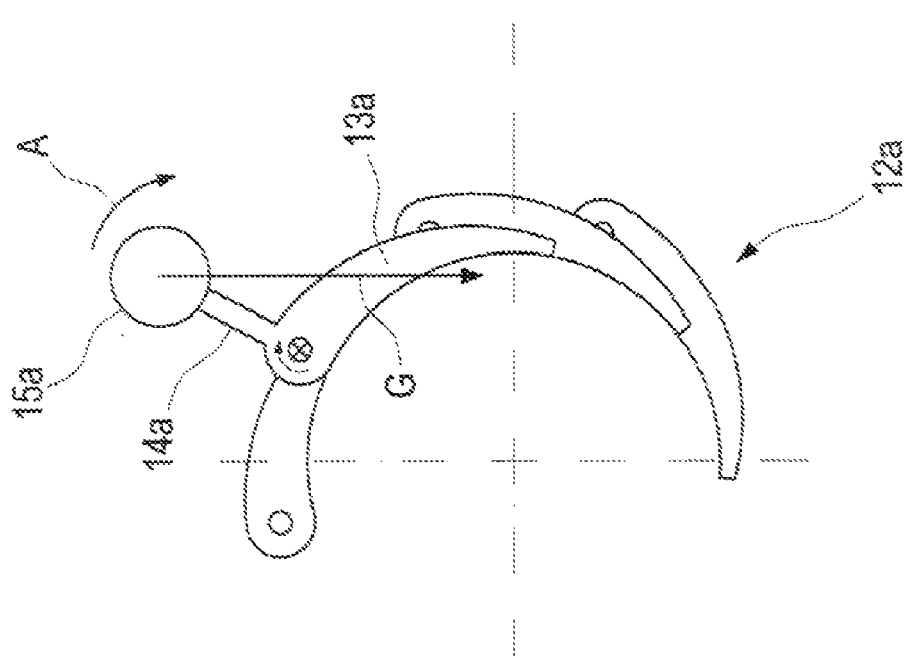
Figure 20:
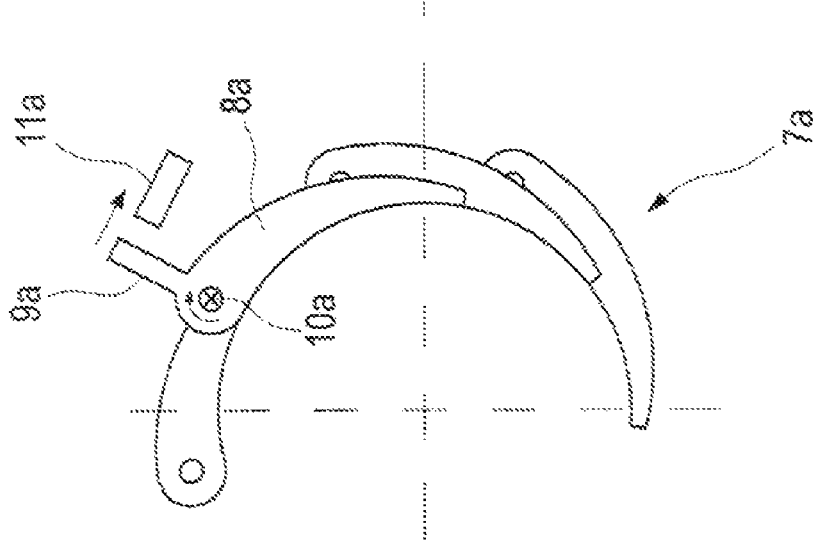

The invention will hereinafter be explained in more detail through examples of embodiments with references to the drawings, wherein:

FIG. 1 is a schematic view of the objective with a manipulator arranged laterally, FIG. 2 is a cross-sectional view of an objective to which a manipulator is attached by a thermal insulator, FIG. 3 is a cross-sectional view of an objective to which a manipulator with a cooling device is coupled wherein the cooling device shields the manipulator, FIG. 4 is a cross-sectional view of an objective of which the wall of the housing is shielded from the outside by active or passive cooling device, FIG. 5 is a cross-sectional view of an objective having an external cooling device to which a manipulator is connected by means of a heat-conducting connection, FIG. 6 is a cross-sectional view of an objective that is shielded by a particle-shield from a manipulator fixes on the outside, FIG. 7 is a cross-sectional view of details of a labyrinth-seal in the wall of the housing of an objective for joining the objective to a manipulator, FIG. 8 is a cross-sectional view of an objective to which a manipulator is connected by means of a bellows seal, FIG. 9 is a cross-sectional view of an objective with an O-ring-seal, FIG. 10 is a cross-sectional view of an objective comprising a magnetic manipulator influencing an optical device without a contact, FIG. 11 is a cross-sectional view of an objective comprising a manipulator arranged on the outside of the objective wherein the manipulator is joined to an adjustable optical element in the objective by means of an active or a passive damping element, FIG. 12 is a cross-sectional view of a detail from the inside of an objective comprising an inside actuator decoupled by means of a spring FIG. 13 is a cross-sectional view of an optical arrangement together with a top view of a lens wherein an objective, in which the lens is positioned, is surrounded by a support, in which manipulators and other units are arranged, FIG. 14 is a longitudinal section through the lens, the objective, and the support in vertical direction, FIG. 15 is a schematic longitudinal view through a driving mechanism comprising a step motor and a mechanical transmission member transmitting the movement FIG. 16 is another embodiment of the driving mechanism according to FIG. 15 comprising an additional reduction means, FIG. 17 is o top view of a lamella of an aperture, FIG. 18 shows a driving arm for a lamella comprising two magnets fixed on both sides of the driving arm, FIG. 19 shows the force F having an effect on the driving arm in dependency on the amplitude A, and FIG. 20-22 shows different embodiments for exerting forces or torques on the driving arm of a lamella of an aperture.

An objective 1 (FIG. 1) comprises a plurality of optical elements (not shown here), as lenses, prisms, gratings, for instance, and other elements diffracting light. To adjust individual elements or to change the properties of individual elements manipulators in form of actuators, piezoelectric actuators, sensors, detectors and the like, for instance, are provided; the manipulators are positioned in towers 2, 3 apart from the objective 1. The towers 2, 3 comprise connecting elements 4, 5 for receiving connections of manipulators in the shape of shafts, rods or other driven elements, to act on individual optical elements inside the objective 1.

Instead of using individual towers 2, 3 a single tower comprising a manipulator may be provided that surrounds the objective 1 as a shell or under the shape of a shell. Hereby, it is taken care that sides 6, 7 of towers 2, 3, especially, turned to face objective 1, are constructed by a material shielding heat to minimize thermal influence on the objective 1. Additionally to thermal decoupling the use of manipulator towers causes a dynamic decoupling and prevents a contamination of the elements inside the objective from damaging substances. Further, an optical system comprising manipulator towers is low-maintenance.

In an embodiment (FIG. 13, 14) a lens 40 is positioned in a mount 41 that is a movable inner ring received by a housing 42 that has the form of a cylinder and extends in vertical direction. The housing 42 is surrounded by an interspace 43 that is frontally, i.e. on the upper and bottom sides, shielded from the environment by a wall and that is delimited on its exterior wall by an inner wall of a support 45. The support 45 has an exterior wall 46 and takes up a plurality of manipulators 47, 48, 49 in its interior. Each of the manipulators 47 through 49 comprises a motor-gear-unit 50 that generates a movement, a torque or a force, to make adjustments at optical devices, as at lens 40 or at an aperture in the interior of the housing 42. Each of manipulators 47 through 49 is connected to a decoupling element 51 that is connectable with a lever or a spindle 52 to adjust an element as lens 40.

However, especially for inserting or removing the support from its connection to the housing 42 of the objective it is necessary to separate all optical elements from the manipulators 47 through 49. The decoupling elements 51 admit an introduction of a movement or a force only into the interior of the objective only in the desired direction and decouple an undesired or damaging component of movement or parts of that movement.

Inside the support 45, further, there are positioned a laser 53 and other measuring devices measuring without contact to determine positions of lenses inside the objective or the position of the support 45 with respect to an outer wall 54 of the housing. It is to be understood that the inner wall 44 of support 45 and, if need be, the housing 41 are transparent to make possible measuring by laser beams.

According to the need the housing 42 and the walls 44, 46 of the support 45 consist of a material that is thermally insulating to prevent or minimize heat conduction from the outside to the housing 42 and thermal radiation from outside to the optical elements.

In the same way the interior of the housing 42, the interspace 43 and the interior of the support 45 are filled by a protective gas and/or they stand under an excess pressure. In different spaces different protective gases may be applied as nitrogen or helium, for instance. In the same way a difference of pressures between the interior housing 42 and the interspace 43 on the one hand and between the interspace 43 and the support 45 on the other hand to prevent solid or gaseous particles from permeating into the interior of the housing 42.

Inside the housing 42 or on its inner side that faces the mount 41, preferably, further gears 55 are provided that convert movements, generated by motor-gear-units of the manipulators 47 through 49 and reduced by their gears, into a rotational, pushing or lifting movement.

Inside the support 45 in the proximity of actuators or sensors arranged on the support 45, electronic elements 56 and/or an interface-electronics 57 may be provided that combine the measurement signals obtained in the interior of the support 45 and/or the signals from the housing 42 and converts them for transmitting them, by a bus system, for instance, to a control or steering computer outside the support 45 so that the computer generates corresponding steering or controlling commands for the manipulators 47 through 49 inside the support 45 or the optical elements inside the housing.

It may be provided that controlling or steering setting-ups are positioned inside the support 45 and that they are connected to the manipulators 47 through 49 and/or the sensors or measuring devices.

In another embodiment (FIG. 2) laterally from the objective 8 a manipulator 10 comprising a plurality of lenses and an aperture 9 is attached to the exterior wall 11 of the objective 8 that serves for changing the diameter of the aperture 9. To at least largely suppress heat conduction and, at least partially, thermal radiation a connecting part is at least partially built up as a thermal insulator 12. The insulator 12 forms an insulating link between the manipulator 10 and the aperture 9. The insulator 12 consists of, for instance, an alloy of titanium or a ceramic with low thermal conductivity. An insulator 12 may be provided that at its part surrounds a connecting part between the manipulator 10 and the aperture 9; the insulator 12 may surround a shaft that forms the effective connection between the manipulator 10 and the aperture 9. In this case, the shaft, preferably, too, consists, at least on a certain part of its length, of a insulating material.

In another embodiment of the invention (FIG. 3) a manipulator 10 or its housing is provided that is surrounded by a cooler 13 or a cooling unit. The cooler 13, substantially, serves to prevent thermal radiation in the direction to the wall 11 of the housing. The cooler 13 is either a passive element that comprises cooling fins or that serves to cool actively by conducting a cooling liquid around the manipulator 10 or by cooling electrically by means of a Peltier element or by other means to achieve a cooling of the manipulator 10.

A wall 14 (FIG. 4) is provided at least on the side of the objective 8 that faces the manipulator 10 or surrounds completely the objective 8 so as to achieve a uniform temperaturing in the objective 8, and serves in another embodiment or additionally to the measures described above, to prevent the objective 8 from warming up. The wall 14, too, contains active or passive cooling means.

Additionally to the measures described above there is provided in another embodiment of the invention a manipulator 10 (FIG. 5) connected to the wall 14 by a thermally conducting connection 15 to lead away heat generated in the manipulator 10 to the cooling wall 14, or that, with other words, the wall 14 cools down the actuator or the sensor that is comprised by the manipulator 10.

In another embodiment (FIG. 6) it is taken care that no particles emanate from a manipulator 16 positioned on the outside of the objective 8 into the interior of the objective 8. The manipulator 16 acts on a shaft by means of a gear 17 wherein the shaft serves to move lamellas of an aperture 18.

Herein a particle shield 19 is provided that comprises a gap seal or a labyrinth seal and that prevents solid particles from permeating from the region of the manipulator 16 to the objective 8. The particle shield 19 is constructed in that way that it prevents particles generated in the gear 17 from permeating into the objective.

Preferably, the objective 8 comprises a gas wash-up, i.e. the objective 8 is connect to a gas source that generates nitrogen, synthetically generated oxygen, helium or another inert gas to avoid permeating of steam, i.e. humidity of the air, into the interior of the objective. The water could be cracked by UV radiation that is applied when exposing the objective to light. The cracking of water would generate highly reactive atomic oxygen that reacts with other substances that are present in the interior of the objective 8, as sulphur, for instances; and other substances could be generated that could react with the coating of the lens or destroy it.

Therefore, a protective gas generated in a gas source in the interior of the objective 8 is brought in under excess pressure so that the protective gas streams from a gap seal 20 (FIG. 7) positioned in the wall 11 of the housing from the interior in direction of an arrow A in the direction of a manipulator 22 connected to the objective 8 by means of a flange 21 whereby the manipulator 22 is connected to a shaft 16 extending into the interior of the objective 8 and serving, for instance, to act on lamellas of an aperture; the protective gas suppresses permeation of solid or gaseous particles. The streaming velocity is chosen high enough that especially no steam may permeate from the environment into the interior of the objective 8.

Another embodiment (FIG. 8) comprises a bellows seal in form of flexible plied bellows 23 that surround a shaft 24 that acts from a manipulator 25 into the interior of the objective 8 on optical element 26, for instance an aperture. The pleated bellows 23, preferably, consist of a metal, high-grade steel, for instance, or rubber or synthetics. Especially, in the two last cases, additionally, a gap seal is applied as shown in FIG. 7 to prevent rubber and synthetic particles from permeating in the interior of the objective 8. The bellows 23 on the one hand permits a movement in the direction of a double arrow B, for instance by a rod or a plurality of rods, and on the other hand to oscillate or displace the shaft 24 or the rod in the direction of a double arrow C.

A sealing up between the interior of the objective 8 (FIG. 9) and a manipulator (not shown in the embodiment) to act on a pushing rod 27 movable in the direction of a double arrow D and serving to act on an element 26. The seal 28 comprises, for instance, an O-ring of rubber or synthetics.

An optical element 29 (FIG. 10) is influenced by an external magnetic field. The element 29 consists, at least partially, of a ferromagnetic material, for instance, in the region of the mount of the lens. The element 29 may be moved because of the magnetic force in direction of a double arrow E by a contact-free effect of a magnet 30 moving in a little distance on the outside of the objective 8. The magnet is either a permanent magnet or an electromagnet.

Instead of applying at least one ferromagnetic part in the element 29 there may be used one or more electromagnets if an electric wire is provided to the interior of the objective.

Similarly as parts inside the objective 8 may be influenced form outside without direct impact into the interior of the objective 8 properties of the element may be measured by an at least one sensor, for instance the position of the element whereby the at least one sensor is arranged on the outside of the embodiment. The sensor is, for instance, an electric, a magnetic or an electromagnetic, especially optical sensor.

In another cross-view of the objective 8 (FIG. 11) is shown how a manipulator 10 arranged outside of the objective 8 is connected to an adjustable optical element 32 in the objective via an active or passive damping element 31.

In a further embodiment a manipulator or actuator 33 (FIG. 12) is arranged in the interior of a housing of the objective 8 on a projection 34 of the wall 11 of the housing. The manipulator 33 is, for instance, a piezoelectric actuator that changes its length because of electrostriction dependent on a change of the applied voltage in the direction of a double arrow F to change the position of a lens 36 positioned in a mount 35.

When applying a spring 37 an oscillation synchronous with the movement of the actuator 33 is damped and is decoupled from the housing so as not to change the position of other optical elements in the housing 8 as of the lens 38 or at least not to change their positions substantially. It is to be understood that a plurality of actuators in the interior are positioned on springs may be arranged, advantageously, on a perimetric projection 34.

According to the present patent application the term "manipulator" is used for those parts that serve to act on a means in the housing, especially in a housing of the objective or of an exposure system, as an actor or an actuator, for instance, a sensor or a gear wherein the parts, preferably, are arranged outside of the housing. This does not exclude that other movable elements, to act on an optical element together with the manipulator or independently of it, may be present.

In another embodiment of the invention a step motor 58 (FIG. 15) comprises eccentric driving shaft 59, to which is coupled a lever rod 60. The lever rod 60 comprises a long lever arm 61 and a short lever arm 62. By the relation of the lengths of both the lever arms 61, 62 the reduction of a distance is to be calculated at which a housing 63 (in the drawing sketch by a triangle 63) of an optical element or a peripheral zone of an element is connected or hinged to an element.

The lever 60 is rotatable about a rotational axis 64 to lift a lever arm 62 in the direction of an arrow 66 according to the reduction if the step motor 58, together, if need be, with another reduction gear, for example a micro-harmonic planet driving gear, moves in the direction of arrow 65 and therefore together with the lever arm 61 so that a force is exerted on the mount of the element in direction to the top (z-direction).

In another embodiment (FIG. 16) a mount 67 of an optical element is connected by two or more elements having a circular structure that corresponds to the outer perimeter of the mount 67 are connected to a manipulator 70 of which in the interior a step motor 71 is integrated. At a shaft 72 driven by this step motor 71 a connecting or piston rod 73 is hinged or fixed that is connected to a lever 74 by a hinge or joint 76.

The lever 74 at its part is rotatable about a rotational axis 77 to act on the mount 67 of the optical element by means of a lever arm 78 so that the optical element may be shifted by an amount dz in the z-direction. Herein the reduction ratio between the lever arm 78 and the lever arm 79 on the other side of the rotational axis is 1:50.

Sensors 80, 81 may be positioned at the manipulator 70 to measure the position of the shaft 72 and/or of the connecting rod 74 in dependency on the movement of the step motor 71. Both the lever rod 60 as the lever 74 work as reduction gears.

A plurality of manipulators as manipulator 70 shown in FIG. 16 may be positioned on the outer periphery of the element or of its optical mount 67 in different directions to move the optical element in the corresponding degree of freedom. The manipulators need not necessarily positioned on the outside of the housing of the objective but can be positioned inside the housing of the objective; especially the step motors, advantageously, may be positioned in the interior of the housing.

An element to be positioned by means of a manipulator is, for instance, an aperture that preferably, but not necessarily comprises a plurality of lamellas 1a (FIG. 17) of the aperture positioned on a circular contour and that are oscillatable or deviatable from that contour. Instead of the circular contour another mounting element to mount shiftable elements, as for instance the lamellas 1a, having a linear form and/or having the form of a curve may be provided.

Each lamella 1a of the aperture is positioned by a solid body hinge 2a, as for instance a hinge of crossed springs (Kreuzfedergelenk), to be oscillated by means of the hinge 2a. Also a plurality of lamellas 1a may be connected with one another so that by deviating of a driving arm 3a positioned at the element and/or at the element of the mount (FIG. 18) at least one or all of the lamellas 1a are deviated into their original position against a repelling force as, for example, a force of a spring and that the open inner diameter of the aperture changes.

The driving arm 3a is driven, for instance, by a gear 4a. Thereby the drive may be realized, too, by driving arrangements comprising hydraulic and/or pneumatic devices. In addition, a drive by means of, for instance, a force actuator (for instance, a Lorentz actuator) is possible. When a driving unit has a gear, or more generally when driving units are realized that comprise means to convert a force and/or a torque or a movement, respectively, these may have a mechanic clearance. This leads to the fact that in a central position at which the manipulator does not exert a force (repelling force) on the shiftable element the manipulator has an undefined state because of the clearance with respect to the shiftable element or has an impreciseness with respect to its position.

If, for instance, the gear 4a of FIG. 18 has a clearance on both sides of the driving arm, that is realized as a magnet (or that comprises a magnetic device), magnets 5a, 6a are positioned that attract the driving arm 2a in opposite directions whereby they react in the opposite direction of the force of the spring or compensate for it. Thereby, preferably elastic, solid body hinges are mentioned, for the sake of example only, and are a preferred embodiment wherein also other bearing means may be used that, preferably, comprise a repelling force or a repelling torque with respect to the manipulator. The magnets may be permanent magnets and/or controllable or steerable electromagnets.

The aperture having lamellas 1a as shown in FIG. 17 may, for instance, be used in connection with an objective or an exposure projection system according to the invention, especially in projection illuminating apparatus for the micro-lithography together with an optical system with at least an optical element that may be influenced by a manipulator that generates a repelling force and/or a repelling torque by a first means. Thereby the lamella or the plurality of lamellas of the aperture is the optical element, and the first means is realized, for instance, by an elastic solid body hinge (or a solid body hinge in combination with a spring). According to the invention, the manipulator comprises a second means that, according to the embodiment described above, is a magnet that counteracts to the repelling force and/or repelling torque generated by the first means and that, at least partially, compensates for the force and/or the torque generated by the first means.

If the driving arm 3a is deviated the force and the torque, respectively, that act on the actuator, i.e. the gear 4a, respectively, increase because of the deviation of the solid body hinges because these are realized as elastic elements.

In the same way the magnetic force that acts on the driving arm 3a increases as the arm approaches the magnets 5a, 6a. This means that the magnetic force compensates for the force of the spring (elastic force) or the repelling torque, respectively. Further, it is mentioned that in an embodiment comprising controllable, preferably electrically controllable magnets, as electromagnets in the embodiment of FIG. 20, only two magnets need to be used whereby a magnet is positioned on the lever arm 3a and is moved together with it, and the other magnet is positioned in the proximity of the lever arm, preferably, but not necessarily, fixed in a fix position.

By a suitable choice of the magnets 5a the spring force FK (FIG. 19) may be adjusted always such that in each deviation or each distance of oscillation A the resulting force R of the spring force and the repelling force (or the repelling torque) and the magnetic force MK (or the torque generated by the magnetic force, respectively) always have a value different from zero so that a force or a torque is exerted on the driving arm 3a in each position. By this each kind of clearance in the gear is excluded.

The clearance of the manipulator is excluded especially over the whole range of all possible deviation distances when the value different from zero of the resulting force R hat the same sign (+ or −) over the whole range of the displacement distance. The resulting force R (FIG. 19) is not necessarily a function of the displacement distance of the displaceable element, but may be a constant. Generally, the resulting force R may an optional function R(A) of the displacement distance wherein A is a displacement parameter for the displaceable element, and therefore, also may be an angle. In the alternative, the force F according to FIG. 19 may be a torque or any other unit containing the force or being a function of the force, as, for instance an electric or a magnetic field to be applied.

Not only magnets may be used to compensate for the force, but also all other elements that counteract to a repelling force of solid body hinges with an increasing displacement or deviation.

Apart from magnets also other elements as springs or masses may be applied for compensating for a weight or for compensating for a torque. In the same way electrostatic forces may be applied instead of magnets or springs.

FIG. 20 shows a detail of an arrangement 7a comprising several lamellas of an aperture that are connected to a driving arm 9a to move the lamellas as shown at the example of a lamella 8a (wherein driving arm corresponds to driving arm 3a of FIG. 19). A one-sided force generated by a magnet 11a counteracts the force applied by a spindle 10a, to rotate lamella 8a from its rest position. The driving arm 9a may be adjusted by means of a driving unit 4a, for example by a gear 4a wherein the force necessary for adjusting or the torque, preferably is reduced as by magnet 11a an at least partial compensation for the force applied by the spindle 10a is realized. In the alternative a magnet 11a may be used as an actuator to adjust the lever 9a if the lever 9a is controllable as, for instance, when the magnet is an electromagnet or a permanent magnet.

In the case of an aperture 12a (FIG. 21) positioned vertically and having a plurality of lamellas 13a at the outer end of a driving arm 14a a mass 15a is positioned that exerts a weight force G on the driving arm 14a in the vertical direction. As the displacement of lamella 13a is increasing the torque exerted on the driving arm 14a increases, too, and counteracts to the force generated by the spindle that exerts a torque on the lamella 13a of the aperture as shown in FIG. 20. Also in this case a driving unit acting on the lever 14a is released with respect to a torque to be exerted by the driving unit so that the resulting torque or the resulting force have proceed as shown in FIG. 19.

In another embodiment (FIG. 22) a spring 19a positioned at a driving arm 16a of a lamella 17a of an aperture 18a counteracts to a force exerted by a spindle on a solid body hinge 20a to rotate the lamella 17a.

The present invention is not limited by the embodiments shown in the drawings and explained above but comprises other embodiments that may be derived when features of the embodiments as shown are exchanged or combined.

Thus, in an embodiment of FIG. 20 additionally to the magnet 11a of the embodiment according to FIG. 22 and/or a weight 15a according to the embodiment of FIG. 22 may be inserted. Further, a solid body hinge of FIG. 22 may be exchanged by spindle 10a of FIG. 20.

All disclosure contained in the priority documents U.S. 60/647,633, U.S. 60/647,855, and DE 10 2005 034 235.3 is made part of the disclosure of the present application by reference.

The invention claimed is:

1. An optical assembly, comprising:
   a housing;
   at least one optical element;
   a decoupling element; and
   at least one manipulator;
   wherein:
      the at least one optical element is influenceable by the at least one manipulator;
      the at least one manipulator is arranged either outside of the housing or in a holding device that is at least partially separated from the housing via the decoupling element;
      there is provided an effective coupling between the manipulator and the at least one optical element in the interior of the optical assembly;
      the optical assembly is a microlithography optical assembly;
      the at least one manipulator comprises an active driving element; and
      the at least one manipulator comprises an electronic element, a sensor, an actuator or a device configured to achieve contactless measuring.

2. An optical assembly according to claim 1 wherein the at least one manipulator comprises a measuring apparatus or an actuator configured to record movements of a driving element.

3. An optical assembly according to claim 2 wherein the manipulator is coupled to the decoupling element so that the decoupling element can decouple damaging movements that are superimposed on the desired movement.

4. An optical assembly according to claim 3 wherein the decoupling element comprises a damper configured to send the desired movement to the interior of the housing to change the position or to shift the at least one optical element.

5. An optical assembly according to claim 1, wherein the effective connection between the at least one optical element and the at least one manipulator comprises a member comprising shaft a thread, a strand, a rod an arrangement comprising multiple rods or a spring.

6. An optical assembly according to claim 5 wherein the member comprises a thermally insulating material.

7. An optical assembly according to claim 1 wherein a rod is sealed with respect to the interior of the housing and/or to the at least one optical element by a seal.

8. An optical assembly according to claim 1 wherein the at least one manipulator impinges on the at least one optical element via an electric field, a magnetic field or a combination of an electric and a magnetic field without any mechanic connection between the interior of the of the at least one optical element and the exterior of the housing.

9. An optical assembly according to claim 1 wherein the at least one manipulator comprises a tower, a ring, or a column outside of the housing.

10. An optical assembly according to claim 1 wherein the at least one manipulator or an interspace between the at least one manipulator and the at least one optical element is insulated thermally and/or electrically and/or against penetration of particles with respect to the exterior of the housing so that only desired effects influencing the optical assembly from the exterior of the housing are admitted to the interior of the optical assembly.

11. An optical assembly according to claim 1 wherein oscillations of temperature admitted in an interspace between the at least one manipulator and the at least one optical element are smaller than in a support of the at least one manipulator.

12. An optical assembly according to claim 1 wherein a distance between the housing and a support of the at least one manipulator is measurable by a measuring device.

13. An optical assembly according to claim 1 wherein the at least one manipulator and/or a measuring device are connected to a controlling computer or another unit to evaluate signals coming from the support and/or the housing.

14. An optical assembly according to claim 13 wherein the controlling computer generates signals for the at least one manipulator, the measuring arrangement and/or for the units positioned in the interior of the housing.

15. An optical assembly according to claim 1 wherein the at least one manipulator is arranged in a cooling jacket or that the at least one manipulator is solely or together with a cooling element included in its own housing whereby the housing is formed by a thermal insulator, or that a Peltier element serves as a cooling element for the manipulator.

16. An optical assembly according to claim 1 wherein the at least one manipulator comprises a motor and/or an actuator wherein the motor may be an electric motor.

17. An optical assembly according to claim 1 wherein the at least one manipulator comprises a pneumatic or a hydraulic motor.

18. An optical assembly according to claim 1 wherein the at least one manipulator is attached to the housing by an active or a passive decoupling element.

19. An optical assembly according to claim 1 wherein the at least one manipulator is attached to the housing by a passive damping element.

20. An optical assembly according to claim 1 wherein the at least one manipulator is attached to the housing by an active damping element.

21. An optical assembly according to claim 1 wherein the at least one manipulator is coupled to the housing by a thermal insulator to avoid thermal conduction of heat generated in the manipulator into the interior of the housing.

22. An optical assembly according to claim 1 wherein the at least one manipulator is shielded by an active or a passive cooling element surrounding the housing at least in the proximity of the manipulator or that a cooling element is provided between the housing and the manipulator.

23. An optical assembly according to claim 1 wherein the at least one manipulator is connected to the cooling element by a connection or a link conducting the heat.

24. An optical assembly according to claim 1 wherein the at least one manipulator is separated from the interior of the housing by a shield shielding off particles.

25. An optical assembly according to claim 1 wherein an actuator or the at least one manipulator acts from the outside on an element inside of the housing that is activated by a magnetic or an electric field wherein the housing consists of a dielectric material.

26. An optical assembly according to claim 1 wherein properties of the at least one optical element are measurable by a sensor that is positioned outside of the optical assembly, and wherein the sensor is an electric, a magnetic or an electromagnetic sensor.

27. An optical assembly according to claim 26 wherein the sensor is surrounded by a cooling jacket and/or a cooling element is arranged in the proximity of the sensor, or the sensor is surrounded by a thermal insulator.

28. An optical assembly according to claim 26 wherein a cooling element is arranged between the at least one manipulator and the sensor.

29. An optical assembly according to claim 1 wherein a thermal detector is provided in the proximity of the at least one manipulator or the sensor to detect the heat generated by the at least one manipulator or the sensor, respectively.

30. An optical assembly according to claim 1 further comprising a cooling element that is controllable by values generated by a detector and that receives the heat and/or compensates for it by cooling wherein, additionally, the amount of heat generated may be measured by a detector, and a voltage may be applied to a cooling element that is sufficient to equalize the heat by cooling.

31. An optical assembly according to claim 1 wherein, to shield the optical system, an arrangement of shells is provided for the optical assembly wherein the at least one optical element is positioned in an inner shell of the objective and the at least one manipulator is positioned in an outer shell of the optical assembly.

32. An optical arrangement, comprising:
a housing having an interior;
a dynamic decoupling element;
at least one manipulator in the interior of the housing;
at least one optical element arranged in the housing and is influenceable by the at least one manipulator
wherein the at least one manipulator is decoupled from the housing by the dynamic decoupling element, and the optical arrangement is a microlithography optical arrangement.

33. An optical arrangement according to claim 32 wherein a quality or property of the at least one optical element is ascertained by a sensor or a detector.

34. An arrangement according to claim 32 wherein the at least one manipulator and/or a sensor are arranged in the interior of the housing.

35. An optical arrangement according to claim 32 wherein the decoupling element is a passive element.

36. An optical arrangement according to claim 35 wherein the decoupling element is a piezoelectric actuator.

37. An optical arrangement according to claim 35 wherein the interior of the housing has an excess pressure with respect to an exterior of the housing.

38. An optical arrangement according to claim 35 further comprising springs or pneumatic or hydraulic cylinders that are mechanic actuators.

39. An optical assembly, comprising:
a housing;
at least one optical element;
a decoupling element; and
at least one manipulator;
wherein:
the at least one optical element is influenceable by the at least one manipulator;
the at least one manipulator is arranged either outside of the housing or in a holding device that is at least partially separated from the housing via the decoupling element;
there is provided an effective coupling between the manipulator and the at least one optical element in the interior of the optical assembly;
the optical assembly is a microlithography optical assembly; and
a rod is sealed with respect to the interior of the housing and/or to the at least one optical element by a seal.

40. An optical assembly according to claim 39 wherein the at least one manipulator comprises a measuring apparatus or an actuator configured to record movements of a driving element.

41. An optical assembly according to claim 40 wherein the manipulator is coupled to the decoupling element so that the decoupling element can decouple damaging movements that are superimposed on the desired movement.

42. An optical assembly according to claim 41 wherein the decoupling element comprises a damper configured to send the desired movement to the interior of the housing to change the position or to shift the at least one optical element.

43. An optical assembly, comprising:
a housing;
at least one optical element;
a decoupling element; and
at least one manipulator;
wherein:
the at least one optical element is influenceable by the at least one manipulator;
the at least one manipulator is arranged either outside of the housing or in a holding device that is at least partially separated from the housing via the decoupling element;
there is provided an effective coupling between the manipulator and the at least one optical element in the interior of the optical assembly;
the optical assembly is a microlithography optical assembly; and
the at least one manipulator impinges on the at least one optical element via an electric field, a magnetic field or a combination of an electric and a magnetic field without any mechanic connection between the interior of the of the at least one optical element and the exterior of the housing.

44. An optical assembly according to claim 43 wherein the at least one manipulator comprises a measuring apparatus or an actuator configured to record movements of a driving element.

45. An optical assembly according to claim 44 wherein the manipulator is coupled to the decoupling element so that the decoupling element can decouple damaging movements that are superimposed on the desired movement.

46. An optical assembly according to claim 45 wherein the decoupling element comprises a damper configured to send the desired movement to the interior of the housing to change the position or to shift the at least one optical element.

47. An optical assembly, comprising:
a housing;
at least one optical element;
a decoupling element; and
at least one manipulator;
wherein:
the at least one optical element is influenceable by the at least one manipulator;
the at least one manipulator is arranged either outside of the housing or in a holding device that is at least partially separated from the housing via the decoupling element;
there is provided an effective coupling between the manipulator and the at least one optical element in the interior of the optical assembly;
the optical assembly is a microlithography optical assembly; and
the at least one manipulator comprises a tower, a ring, or a column outside of the housing.

48. An optical assembly according to claim 47 wherein the at least one manipulator comprises a measuring apparatus or an actuator configured to record movements of a driving element.

49. An optical assembly according to claim 48 wherein the manipulator is coupled to the decoupling element so that the decoupling element can decouple damaging movements that are superimposed on the desired movement.

50. An optical assembly according to claim 49 wherein the decoupling element comprises a damper configured to send the desired movement to the interior of the housing to change the position or to shift the at least one optical element.

51. An optical assembly, comprising:
a housing;
at least one optical element;
a decoupling element; and
at least one manipulator;
wherein:
the at least one optical element is influenceable by the at least one manipulator;
the at least one manipulator is arranged either outside of the housing or in a holding device that is at least partially separated from the housing via the decoupling element;
there is provided an effective coupling between the manipulator and the at least one optical element in the interior of the optical assembly;
the optical assembly is a microlithography optical assembly; and
wherein:
the at least one manipulator is attached to the housing by an active or a passive decoupling element;
the at least one manipulator is attached to the housing by a passive damping element; or
the at least one manipulator is attached to the housing by an active damping element.

52. An optical assembly according to claim 42 wherein the at least one manipulator is attached to the housing by an active or a passive decoupling element.

53. An optical assembly according to claim 42 wherein the at least one manipulator is attached to the housing by a passive damping element.

54. An optical assembly according to claim 42 wherein the at least one manipulator is attached to the housing by an active damping element.

55. An optical assembly according to claim 42 wherein the at least one manipulator comprises a measuring apparatus or an actuator configured to record movements of a driving element.

56. An optical assembly according to claim 55 wherein the manipulator is coupled to the decoupling element so that the decoupling element can decouple damaging movements that are superimposed on the desired movement.

57. An optical assembly according to claim 56 wherein the decoupling element comprises a damper configured to send the desired movement to the interior of the housing to change the position or to shift the at least one optical element.

58. An optical assembly, comprising:
a housing;
at least one optical element;
a decoupling element; and
at least one manipulator;
wherein:
the at least one optical element is influenceable by the at least one manipulator;
the at least one manipulator is arranged either outside of the housing or in a holding device that is at least partially separated from the housing via the decoupling element;
there is provided an effective coupling between the manipulator and the at least one optical element in the interior of the optical assembly;
the optical assembly is a microlithography optical assembly;
the at least one optical element are measurable by a sensor that is positioned outside of the optical assembly; and
the sensor is an electric, a magnetic or an electromagnetic sensor.

59. An optical assembly according to claim 58 wherein the sensor is surrounded by a cooling jacket and/or a cooling element is arranged in the proximity of the sensor, or the sensor is surrounded by a thermal insulator.

60. An optical assembly according to claim 58 wherein a cooling element is arranged between the at least one manipulator and the sensor.

61. An optical assembly according to claim 58 wherein the at least one manipulator comprises a measuring apparatus or an actuator configured to record movements of a driving element.

62. An optical assembly according to claim 61 wherein the manipulator is coupled to the decoupling element so that the decoupling element can decouple damaging movements that are superimposed on the desired movement.

63. An optical assembly according to claim 62 wherein the decoupling element comprises a damper configured to send the desired movement to the interior of the housing to change the position or to shift the at least one optical element.

* * * * *

UNITED STATES PATENT AND TRADEMARK OFFICE
CERTIFICATE OF CORRECTION

| | | |
|---|---|---|
| PATENT NO. | : 7,791,826 B2 | Page 1 of 1 |
| APPLICATION NO. | : 11/814713 | |
| DATED | : September 7, 2010 | |
| INVENTOR(S) | : Hermann Bieg | |

It is certified that error appears in the above-identified patent and that said Letters Patent is hereby corrected as shown below:

Column 1,
Line 9, delete "Application" and insert --Applications--

Column 7,
Line 3, after "hinge" insert --.--

Column 8,
Line 65, after "spring" insert --,--

Column 9,
Line 7, after "movement" insert --,--

Column 10,
Line 65, delete "temperaturing" and insert --temperature--

Column 16,
Line 4, delete "shaft" and insert --shaft,--

Column 16,
Line 4, delete "rod" and insert --rod,--

Signed and Sealed this

Twenty-third Day of November, 2010

David J. Kappos
*Director of the United States Patent and Trademark Office*